United States Patent [19]

Smith

[11] 4,123,359
[45] * Oct. 31, 1978

[54] WATER PURIFYING SYSTEM AND PUMP THEREFOR

[76] Inventor: John D. Smith, 5748 King Dr., Chicago, Ill. 60637

[*] Notice: The portion of the term of this patent subsequent to Jan. 11, 1994, has been disclaimed.

[21] Appl. No.: 753,202

[22] Filed: Dec. 22, 1976

Related U.S. Application Data

[63] Continuation-in-part of Ser. No. 566,004, Apr. 7, 1975, Pat. No. 4,002,566.

[51] Int. Cl.² .............................................. E04H 3/20
[52] U.S. Cl. .................................. 210/169; 210/500 R
[58] Field of Search ............... 210/169, 150, 248, 198, 210/205, 500, 197; 119/3, 5; 417/424

[56] References Cited

U.S. PATENT DOCUMENTS

| | | | |
|---|---|---|---|
| 2,137,397 | 11/1938 | Haldemon | 210/169 X |
| 2,515,538 | 7/1950 | Wall | 210/169 |
| 2,935,199 | 5/1960 | Willinjer | 210/169 |
| 3,722,685 | 3/1975 | Prenston et al. | 210/169 |
| 3,771,544 | 11/1975 | Horrath | 210/169 |
| 3,864,261 | 2/1975 | Mosterjoseph | 210/169 |
| 3,915,351 | 10/1975 | Kirstalfy | 417/424 |
| 4,002,566 | 1/1977 | Smith | 210/169 |

FOREIGN PATENT DOCUMENTS 2,209,722  7/1974  France .................................. 210/169

Primary Examiner—Theodore A. Granger

[57] ABSTRACT

A system for purifying water includes a perforated member disposed within a container confining water therein, the perforated member being spaced above the bottom of the container. A pump transfers water between an upper portion of the container above the perforated member and the bottom of the container below the perforated member to recirculate the water, and the recirculated water is aerated. A bacteria culture bed overlies the perforated member and includes a mixture of gravel, clay and other material or materials, such as skeletal residue material and readily decomposable vegetal material. The pump includes a sump box containing water therein and a pumping device mounted therein. The pumping device includes an impeller mounted within a housing disposed within the water in the box. A shaft extends through an opening in the housing, and the impeller is fixed to the lower end portion of the shaft. A motor is connected drivingly to the upper end portion of the shaft, and a non-metallic sleeve surrounds the shaft and engages sealingly at its lower end the impeller so that the sleeve extends through the opening in the housing between the impeller and the space above the water in the box, whereby all of the wetted surfaces are non-corrosive.

9 Claims, 3 Drawing Figures

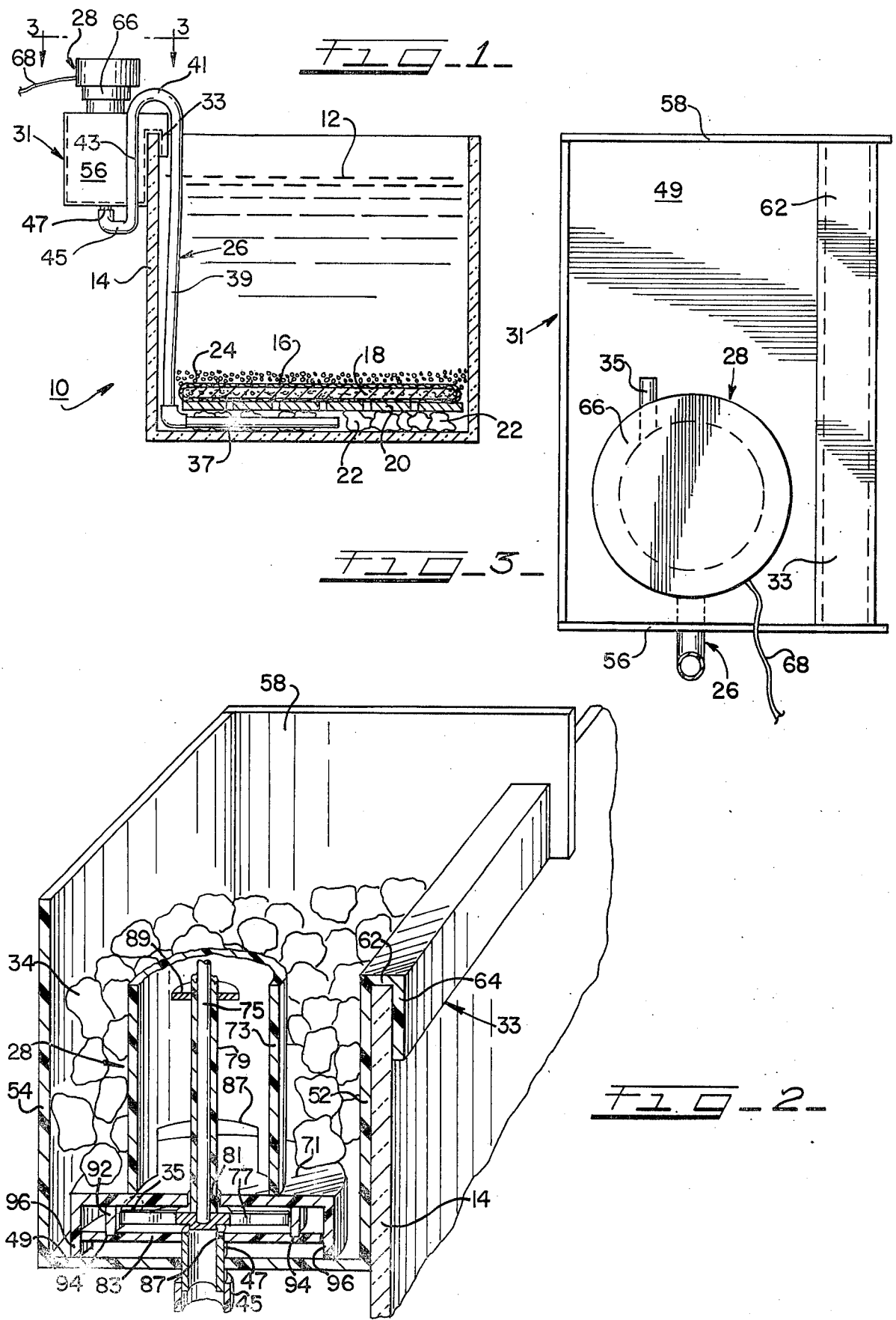

WATER PURIFYING SYSTEM AND PUMP THEREFOR

This patent application is a continuation-in-part patent application of U.S. patent application Ser. No. 566,004, filed Apr. 7, 1975, now U.S. Pat. No. 4,002,566.

The present invention relates in general to a water purifying system and a pump therefor, and it more particularly relates to a water purifying system and a pump therefor for use in aquariums, swimming pools and other systems.

There have been many different types and kinds of water purifying systems, such as filtration systems for aquariums. Such water purifying systems strain the water to remove suspended matter therefrom to provide the water with a clearer appearance. However, after a long period of use of such a system, the water no longer can be purified in that manner and it eventually becomes cloudy in appearance. Therefore, while the prior systems may be entirely satisfactory for some applications, it would be highly desirable to have a water purifying system which can maintain the clarity of the water in a healthy condition for extremely long periods of time without having to shut down the system for cleaning purposes. Such a system should require as little maintenance as possible, and it should be relatively inexpensive to manufacture. Also, unlike prior filter systems, there should be no need to replace or repair filter elements periodically. Also, the pump for use in such a system should be able to recirculate the water at a reasonably high flow rate without having any of the wetted surfaces composed of corrosive materials which would otherwise adversely affect the water chemistry. Such a pump should be relatively inexpensive to manufacture.

Therefore, the principal object of the present invention is to provide a new and improved water purifying system and a pump therefor, which system requires little or no cleaning operations, such pump being relatively inexpensive to manufacture and having a relatively high flow rate without having the wetted surfaces being composed of corrosive materials.

Briefly, the above and further objects of the present invention are realized by providing a water purifying system, which includes a perforated member disposed within the container and spaced above the bottom thereof. A pump transfers water between an upper portion of the container above the perforated member and the bottom of the container below the member to recirculate the water. The recirculated water is aerated, and a bacteria culture bed is disposed in overlying relationship on the perforated member. The bacteria culture bed includes a mixture of gravel, clay and one selected from the group consisting of skeletal residue material, readily decomposable vegetal material and skeletal residue material and readily decomposable vegetal material. The pump includes a sump box containing water therein and a pump device mounted therein. The pump device has an impeller disposed within a housing positioned within the water in the box. A shaft extends through an opening in the impeller housing, and the impeller is fixed to the shaft at its lower end, a motor being connected drivingly to the upper end portion of the shaft above the water in the box. A non-metallic sleeve surrounds the shaft and engages sealingly at its lower end the impeller. The sleeve extends through the opening in the housing between the impeller and the space above the water in the box. The impeller is preferably composed of non-metallic material, such as plastic, so that the wetted surfaces are not corrosive.

The above and still further highly important objects and advantages of the invention will become apparent from the following detailed specification, appended claims and attached drawings, wherein:

FIG. 1 is a vertical cross-sectional view of a water purifying system and pump therefor constructed in accordance with the present invention;

FIG. 2 is a greatly enlarged pictorial cross-sectional view of the pump for the system of FIG. 1; and FIG. 3 is a plan view of the pump of FIG. 2.

Referring now to the drawings, and more particularly to FIG. 1 thereof, there is shown a water purifying system 10 for maintaining the quality of the water chemistry of the water 12 confined in a container 14, the system 10 being constructed in accordance with the present invention. It should be understood that the container 14 may be an aquarium tank, a swimming pool, a fish pond or the like as will become apparent to those skilled in the art. The system 10 generally comprises a porous bag 16 containing a mixture of natural ingredients 18 resting on the top surface of a perforated plastic plate 20 which is supported above the bottom wall of the container 14 by any convenient means, such as a set of spaced-apart rocks 22. Gravel 24 is disposed over the bag 16 and the plate 20 to conceal it from view, and a suction tube 26 draws water from under the plate 20 by means of a pump 28 disposed within a sump box 31 attached to the top edge of the container 14. An overflow lip 33 of the sump box 16 returns the water back to the container 14 above the perforated plate 20 for recirculating the water in the container 14. As best seen in FIGS. 2 and 3 of the drawings, a discharge outlet 35 for the pump 28 causes the water to be transferred from the sunction tube 26 to the interior of the sump box 31 which is filled with rocks or gravel 34.

In use, a bacteria culture is established and maintained in the bed formed by the mixture of natural ingredients 18 so that the bacteria culture cleans the water in the container 14. The overflow lip 33 serves to aerate the water by flowing it through air in a water fall effect. The aerated recirculated water flows through the natural ingredients to facilitate greatly the proliferation of the bacteria in the natural ingredients. The bag 16 containing the mixture of natural ingredients 18 is of substantially the same size as the cross-sectional area of the inside of the container 14 so that substantially all of the water passes through the bacteria culture disposed within the mixture of natural ingredients 18 for purifying the water. The bed of natural ingredients 18 provides a site for microorganisms in the water to colonize and to be nourished by the energy-yielding substances in the putrescible material, such as waste products produced by fish, in the container 14, uneaten food and the like, constantly being introduced in the container 14. The process taking place in the bacteria culture in the natural ingredients 18 forms a gelatinous zoogloeal film to provide a biological flocculation and precipitation for the biological destruction of all putrescible matter in the water coming into contact with the film surfaces.

The rocks or gravel 34 serve to strain out of the water flowing therethrough large particles, such as plant debris and other decomposable material which would otherwise take a long period of time for biological, construction thereof. The rocks and gravel also seve to hold natural plants the roots of which utilize nitrogenous products from the water to help maintain a good water chemistry for the water being recirculated in the system 10. Also, the agitation of the water being discharged from the outlet 35 greatly facilitates the removal of unwanted large particles from the water. Furthermore, the rocks and gravel 34 include particles of bituminous coal which serves to help clarify the water.

Considering now the suction tube 26 in greater detail with reference to FIG. 1 of the drawings, the suction tube 26 includes a horizontal portion 37 extending under the perforated plate 20 terminating in an open end disposed near the center portion of the plate 20. A vertically extending portion 39 is disposed in the container 14 near the rear wall thereof and connects in fluid communication the horizontal portion 37 and a reversely bent portion 41 positioned over the top edge of the rear wall of the container 14. A vertical portion 43 connects in fluid communication the reversely bent portion 41 and a lower reversely bent portion 45, which in turn is connected in fluid communication with an inlet 47 in the bottom wall 49 of the sump box 31 to deliver water to the pump 28 as hereinafter described in greater detail. Thus, it should be noted that water flows from under the plate 20 by the suction created by the pump 28 and also by a siphoning effect since the reversely bent portion 45 is disposed on the outside of the container 14 below the level of the water 12 in the container 14.

Considering now the sump box 31 in greater detail with reference to the drawings, the box 31 includes a front wall 52 and a parallel spaced-apart rear wall 54. A pair of end walls 56 and 58 serve to provide the box 31 with a rectangular cross-sectional shape. The overflow lip 33 includes a reversely bent portion having a horizontal portion 62 overlying the top edge of the rear wall of the container 14 and terminating in a depending distal end vertical portion 64 disposed within the container 14. It should be noted that the overflow lip 33, the bottom wall 49 and the rear wall 54 are of a one-piece construction, and the end walls 56 and 58 are fixed to the end edges of the one-piece construction in a water-tight manner. The sump box 41 is preferably composed of a non-metallic material, such as plastic material, so as not to adversely affect the quality of the water contained therein.

Considering now the pump 28 in greater detail with reference to FIGS. 2 and 3 of the drawings, the pump 28 includes an electric motor 66 disposed above the top edge of the sump box 31 above the water contained therein. An electric cord 68 is adapted to be connected at one of its ends (not shown) to a source of electrical power for energizing the motor 66. An impeller housing 71 is disposed above the bottom wall 49 of the sump box 31 beneath the water level in the box 31. A shaft housing 71 is connected rigidly at its lower end by any suitable technique, such as ultrasonic welding, to the impeller housing 71, the shaft housing 73 surrounding a shaft 75 (FIG. 2). A four-vane impeller 77 is fixed at its lower end to the shaft 75.

A flexible outer tube 79 composed of non-corrosive material, such as plastic, surrounds the shaft 75 in a snug manner. The shaft 75 is preferably composed of metallic material, and thus the tube or sleeve 79 protects the shaft from coming into contact with the water and thus becoming oxidized, whereby the water chemistry would otherwise be adversely affected thereby.

The impeller housing 71 includes a bottom plate 83 having a centrally-disposed opening 85 therein through which extends in fluid communication therewith the inlet 47 for the pump, which inlet 47 is connected in fluid communication with the lower reversely bent portion 45 to introduce water into the interior of the housing 71 where the impeller 77 can discharge the water from the outlet 35.

A centrally-disposed opening 81 in the upper wall of the impeller housing 71 loosely receives the shaft 75 with the tube 79 thereon, the shaft having the impeller 77 fixed to the lower end thereof and extending upwardly to the motor 66 which is drivingly connected thereto. In order to insure that all of the wetted surfaces are composed of non-metallic materials, the entire impeller housing 71, the impeller 77 and the outer tube 79 are composed of plastic materials. Also, the lower edge of the outer tube 79 is sealed by any convenient technique, such as by applying an adhesive or by a tight pressed fit, to the impeller 77. A large opening 87 in the shaft housing 73 near the impeller housing 71 permits water to flow into the housing 71 and from there through the opening 81 in the impeller housing 71 to maintain the impeller 77 in a primed condition, since the opening 87 and the impeller housing 71 are disposed below the water level in the sump box 31, the opening 87 being positioned below the horizontal portion 62 of the lip 33 over which flows the water from the box 31 to determine the height of the water level in the box 31. Thus, no expensive shaft seal is required for the opening 81, and there is no opportunity for the shaft seal to leak as is the case in a conventional in-line pump.

A centrally-apertured flexible slinger ring 89 surrounds the flexible outer tube 79 to splash water back into the box 31 when water tends to creep up the tube 79 during operation of the pump to protect the electric motor 66 from becoming damaged by water. The ring 89 is secured in place by friction.

The impeller housing 71 includes an annular inner wall 92 depending from the top horizontal wall of the impeller housing 71. A circular groove 94 in the upper face of the plate 83 snugly receives the bottom edge of the inner wall 92 to fix the plate in place. A series of legs or feet 96 at the bottom of the housing 73 spaces the plate 83 from the bottom wall 49 of the box 31 so that water is drawn up into the impeller housing from the bottom of the box 31, whereby water does not remain still and thus becomes stagnant at the bottom of the box 31. The water is drawn into the housing 71 from below through a series of small openings (not shown) in the plate 83.

Considering now the composition of the bed of natural ingredients, the natural ingredients are in the form of a mixture, and the following is an example of one preferred form of the invention:

EXAMPLE 1

48 parts by volume (at a weight of 1.13 grams per cubic centimeter) gravel 32 parts by volume (at a weight of 1.13 grams per cubic centimeter) clay 1 part by volume (at a weight of 0.22 grams per cubic centimeter) powdered diatomaceous earth 1 part by volume (at a weight of 0.82 grams per cubic centimeter) bone meal 1 part by volume (at a weight of 0.50 grams per cubic centimeter) kelp The gravel is natural gravel and ranges in size from 1/16 inch to ½ inch thereof. A uniform mixture of various different sizes of gravel is preferred, but it is to be understood that uniform size gravel may also be employed. The clay is broken up into pieces of approximately the same range of sizes as the gravel. The gravel prevents the bed of natural ingredients from becoming compacted so that water will flow conveniently therethrough, and the gravel serves as a convenient site for the bacteria culture. The clay provides a sticky paste-like substance when maintained in the porous bag submerged in the water to hold the natural ingredients in position to prevent them from entering into suspension in the water. Also, the clay contains bacteria and some nutrients for promoting the growth of the bacteria culture.

The diatomaceous earth and the bone meal are each a form of skeletal residue material, which serves as a nutrient for the proliferation of the bacteria culture. The kelp is a readily decomposable vegetal material, which also serves as a nutrient for the bacteria culture.

When the recirculated water is aerated, the bacteria culture flourishes. The bacteria is known as nitro somonas and nitro bacter, which bacteria is used to assimilate the nitrogen compounds for establishing a good water chemistry for the water, thereby maintaining the water in a clean condition as well as the gravel in the container. It has been found that the rate of flow of recirculation in the container should be fairly rapid to provide enough oxygen to proliferate the bacteria as well as to sustain the fish which may be swimming in the container 14. In this regard, it has been found that the water in the container should be recirculated at least once per hour and preferably it should be recirculated about 50 times per hour.

The composition of the mixture of natural ingredients in general should include gravel, clay and one selected from the group consisting of skeletal residue material, readily decomposable vegetal material and skeletal residue material and readily decomposable vegetal material.

EXAMPLE 2

This example is the same as Example 1, except that the bone meal and kelp are eliminated. Such a mixture is adequate to provide sufficient nutrients to proliferate the bacteria.

EXAMPLE 3

This example is the same as Example 1, except that the diatomaceous earth and the kelp are eliminated.

EXAMPLE 4

This example is the same as Example 1, except that 32 parts by volume (at a weight of 0.03 grams per cubic centimeter) of spaghnum moss is added to the other five ingredients. The spaghnum moss serves to provide for additional nutrients for the bacteria culture.

In general, between 3 and 10 parts by weight of gravel may be employed, but more preferably, between 3 and 5 parts by volume should be included. The most preferred amount of gravel is 3 parts by volume. Between 1 and 6 parts by volume of clay may be incorporated, but more preferably, between 1 and 3 parts by volume of clay should be used. The most preferred amount of clay is 2 parts by volume. Between 1 and 3 parts by volume of spaghnum moss should be employed, but more preferably between 1 and ½ and 2½ parts by volume of moss should be incorporated in the natural ingredients. The most preferred quantity of moss is 2 parts by volume. Between 1/64 and ⅛ part by volume of diatomaceous earth in powdered form is preferred, and even more preferably is a range of between 1/32 and ⅛ part by volume. The most preferred quantity of diatomaceous earth is 1/16 part by volume. As to the bone meal, the preferred range is between 1/64 and ⅛ part by volume, and more preferably, between 1/32 and ⅛ part by volume. The most preferred quantity of bone meal is 1/16 part by volume. The preferred range of kelp is between 1/64 and ⅛ part by volume, and a more preferred range is between 1/32 and ⅛ part by volume. The most preferred quantity of kelp is 1/16 part by volume.

EXAMPLE 5

This example is the same as Example 4, except that kelp is omitted.

EXAMPLE 6

This example is the same as Example 1, except that kelp is omitted.

EXAMPLE 7

This example is the same as Example 1, except that bone meal is omitted.

EXAMPLE 8

This example is the same as Example 1, except that diatomaceous earth is omitted.

EXAMPLE 9

This example is the same as Example 1, except that diatomaceous earth and bone meal are omitted.

EXAMPLE 10

This example is the same as Example 4, except that diatomaceous earth is omitted.

EXAMPLE 11

This example is the same as Example 4, except that bone meal is omitted.

EXAMPLE 12

This example is the same as Example 4, except that bone meal and kelp are omitted.

EXAMPLE 13

This example is the same as Example 4, except that diatomaceous earth and bone meal are omitted.

EXAMPLE 14

This example is the same as Example 4, except that diatomaceous earth and kelp are omitted.

EXAMPLE 15

This example is the same as Example 4, except that diatomaceous earth and bone meal are omitted.

What is claimed is:

1. A system for purifying water, said system including a container confining water therein, comprising:
   a perforated member disposed within the container and spaced above the bottom thereof and extending substantially over the entire area thereof;
   pump means for transferring water between an upper portion of said container above said member and the bottom of said container below said member to recirculate the water;
   means located at the path of travel of the water for aerating it;

a bacteria culture bed overlying said perforated member including a mixture of gravel, clay and one selected from the group consisting of skeletal residue material, readily decomposable vegetal material and skeletal residue material and readily decomposable vegetal material; and said pump means including conduit means disposed in said path of travel of the water and having one of its end portions disposed in the space under said perforated member, and a pump connected to the other end of said conduit means and positioned at least partially outside of the container for transferring water via said conduit means between the underside of said perforated member and said pump, water flow means disposed in said path of travel of the water positioned at least partially outside of the container and connecting in fluid communication said pump and the water in the space above said perforated member.

2. A system according to claim 1, wherein said mixture includes between 3 and 10 parts by volume of gravel and between 1 and 6 parts by volume of clay.

3. A system according to claim 1, wherein said skeletal residue material is one selected from the group consisting of between 1/64 and ⅛ part by volume of bone meal, between 1/64 and ⅛ part by volume of diatomaceous earth and between 1/64 and ¼ part by volume of bone meal and diatomaceous earth.

4. A system according to claim 1, wherein said readily decomposable vegetal material is one selected from the group consisting of between 1 and 3 parts by volume of spaghnum moss, between 1/64 and ⅛ part by volume of kelp, and between 1/64 and 3 parts by volume of spaghnum moss and kelp.

5. A system according to claim 1, wherein said mixture includes 3 parts by volume of gravel, 2 parts by volume of clay, said skeletal residue material being selected from the group consisting of 1/16 part by volume of bone meal, 1/16 part by volume of diatomaceous earth and ⅛ by volume of bone meal and diatomaceous earth, said vegetal material being selected from the group consisting of 2 parts by volume of spaghnum moss, 1/16 part by volume of kelp and 2 1/16 parts by volume of spaghnum moss and kelp.

6. A system according to claim 1, wherein said pumping means includes a sump box containing water and a pump mounted therein, said pump having an impeller housing disposed within the water in said box, a non-metallic impeller disposed within said housing for moving the water, means defining an opening in said housing, a shaft extending through said opening, said impeller being fixed to the lower end portion of said shaft, a motor drivingly connected to the upper end portion of said shaft, means supporting said motor above the water in said box, a non-metallic sleeve surrounding said shaft and engaging sealingly at its lower end said impeller, said sleeve extending through said opening in said housing between said impeller and the space above the water in said box.

7. A system according to claim 6, further including a slinger means disposed above said impeller housing for splashing water back toward said impeller.

8. A system according to claim 6, wherein said impeller and said impeller housing discharging water near the floor of said box, said box having an overflow outlet.

9. A system according to claim 8, wherein said box contains one selected from the group consisting of gravel, rock and gravel and rock.

* * * * *

UNITED STATES PATENT OFFICE
CERTIFICATE OF CORRECTION

Patent No. 4,123,359          Dated October 31, 1978

Inventor(s) John D. Smith

It is certified that error appears in the above-identified patent and that said Letters Patent are hereby corrected as shown below:

On the cover page should be shown:

-- [73] Assignee: Bernard L. Kleinke, Des Plaines, Illinois --

Also on the cover page should be shown:
   Attorney, Agent or Firm -- Bernard L. Kleinke --.

*Signed and Sealed this*

*Twenty-second* Day of *May 1979*

[SEAL]

Attest:

RUTH C. MASON
*Attesting Officer*

DONALD W. BANNER
*Commissioner of Patents and Trademarks*